United States Patent [19]

Vanderpool

[11] Patent Number: 4,676,965

[45] Date of Patent: Jun. 30, 1987

[54] PROCESS FOR PRODUCING HIGH PURITY SILICON NITRIDE

[75] Inventor: Clarence D. Vanderpool, Towanda, Pa.

[73] Assignee: GTE Products Corporation, Stamford, Conn.

[21] Appl. No.: 751,833

[22] Filed: Jul. 5, 1985

[51] Int. Cl.$^4$ ............................................ C01B 21/068
[52] U.S. Cl. ...................................... 423/344; 423/406
[58] Field of Search ................................ 423/344, 406

[56] References Cited
U.S. PATENT DOCUMENTS 4,405,589  9/1985  Iwai et al. ............................ 423/344
4,582,696  4/1986  Crosbie ................................ 423/344

Primary Examiner—H. T. Carter
Assistant Examiner—Lori S. Freeman
Attorney, Agent, or Firm—Donald R. Castle; L. Rita Quatrini

[57] ABSTRACT

A process is disclosed for producing high purity silicon nitride. The process involves contacting an organic compound which can be decomposed into silicon dioxide with essentially anhydrous ammonia at ambient temperature to form a two phase system consisting essentially of ammonia gas and the vapor of the organic compound and heating the two phase system at a sufficient temperature for a sufficient time to form the high purity silicon nitride.

1 Claim, No Drawings

PROCESS FOR PRODUCING HIGH PURITY SILICON NITRIDE

BACKGROUND OF THE INVENTION

This invention relates to a process for producing silicon nitride. More particularly it relates to a process for producing silicon nitride of high purity which does not require further purification.

Silicon nitride is a refractory fibrous material. Depending on the length of the fibers and how they are processed, the material can be used in cutting tools, engines, reinforcing cast metal parts or by using the longer fibers, it can be made into blankets, felts for furnace walls and roof insulation, and flame curtains.

There are several known methods for producing silicon nitride, such as:

1. The reaction between elemental silicon and nitrogen;
2. The reduction of $SiO_2$ with carbon in the presence of nitrogen; and
3. The reaction between $SiCl_4$ and anhydrous $NH_3$.

Reactions 1 and 2 are actually the same. In reaction 2 the carbon first reduces the silicon dioxide to silicon which then reacts with the nitrogen to produce silicon nitride, or it may react with the silicon to produce silicon carbide which results in a decrease in the yield of silicon nitride.

A disadvantage of reaction 1 is that pure silicon is expensive and it also requires grinding to powder before it will react with the nitrogen. Grinding introduces impurities, making the process impractical if a pure product is required.

In 3, the reaction between $SiCl_4$ and $NH_3$ produces products which are both difficult and expensive to remove.

Probable steps of the reaction are:

Step 1 $SiCl_4 + 8NH_3 \rightarrow Si(NH_2)_4 + 4NH_4Cl$

Step 2 $Si(NH_2)_4 \rightarrow Si(NH_2)_3NH \rightarrow Si(NH)_2$

Step 3 $Si(NH)_2 \rightarrow Si_3N_4 + NH_3$.

In step 1, the ammonium chloride must be sublimed off without losing the silicon nitride compound. This is difficult to do because the silicon nitride is so fine that it is carried out with the ammonium chloride. In step 3 the silicon diamide is converted to silicon nitride by heating at about 1400° C. Of course any oxygen present causes oxidation back to $SiO_2$, which makes the process difficult to control.

U.S. Pat. No. 3,244,480 discloses a process for producing silicon nitride which involves using inorganic materials as sources for the silicon dioxide. A disadvantage of using inorganic sources is that the silicon nitride can become contaminated with the residual decomposition products of the silicon dioxide source.

SUMMARY OF THE INVENTION

In accordance with one aspect of this invention there is provided a process for producing high purity silicon nitride. The process involves contacting an organic compound which can be decomposed to yield silicon dioxide with essentially anhydrous ammonia at ambient temperature to form a two phase system consisting essentially of ammonia gas and the vapor of the organic compound, and heating the two phase system at a sufficient temperature for a sufficient time to form the high purity silicon nitride.

DETAILED DESCRIPTION OF THE INVENTION

For a better understanding of the present invention, together with other and further objects, advantages, and capabilities thereof, reference is made to the following disclosure and appended claims in connection with the foregoing description of some of the aspects of the invention.

By the process of this invention, an organic compound which can be decomposed to yield silicon dioxide is reacted with essentially anhydrous ammonia to produce silicon nitride which does not have to be further purified for high purity applications.

Essentially anhydrous ammonia is first contacted with an organic compound which can be decomposed to yield silicon dioxide at ambient temperature to form a two phase system consisting essentially of ammonia gas and the vapor of the organic compound. The preferred organic compound is tetraethyl silicate. This step can be done in any conventional manner. When tetraethyl silicate is used the ammonia gas is preferably bubbled into a container holding the tetraethyl silicate liquid to form the mixture of the ammonia gas and the liquid vapor. The flow rate of the ammonia gas is preferably from about 3 to about 4 cubic feet per hour.

The resulting two phase system is then conducted such as by tubing into a furnace, preferably a closed gas tight tube furnace which is at a sufficient temperature which is generally at from about 1350° C. to about 1800° C. and preferably from about 1350° C. to about 1400° C. to form the silicon nitride. The flow rate of the two phase system to the furnace is such that the time in the furnace at temperature is sufficient to allow the formation of silicon nitride. This is preferably from about 3 to about 8 hours when the flow rate to the furnace is from about 3 to about 4 cubic feet per hour. After the reaction time at temperature, the contents of the furnace are allowed to cool under nitrogen to ambient temperature. The reaction product is present essentially as fibers which are identified as silicon nitride.

While the above described method is the preferred method of carrying out the steps of the invention, it is to be understood that any method by which the two phase system is formed and heated to produce silicon nitride can be used.

The silicon nitride produced by the above described process does not contain ammonium chloride and, therefore does not require a second firing step which causes losses of the silicon nitride as well. During the course of the reaction, the organic source of silicon dioxide decomposes into products which are volatilized so that there is essentially no contamination of the product. The silicon nitride of this invention has a low carbon content and therefore, again no firing is required to remove carbon. The silicon nitride has a purity of at least about 95%.

To more fully illustrate this invention, the following non-limiting example is presented.

Anhydrous ammonia is bubbled through a container of tetraethyl silicate at room temperature at a flow rate of about 3.5 cu ft/hr. The mixed gas and vapor are carried directly into the hot zone of a furnace at about 1400° C. for about 3.5 hours. The furnace is then cooled under nitrogen. Silicon nitride is present essentially in the form of fibers. The silicon nitride has a purity of about 95%.

While there has been shown and described what are at present considered the preferred embodiments of the invention, it will be obvious to those skilled in the art that various changes and modifications may be made therein without departing from the scope of the invention as defined by the appended claims.

What is claimed is:

1. A process for producing high purity silicon nitride comprising:
  (a) contacting tetraethyl silicate with essentially anhydrous ammonia at ambient temperature to form a two phase system consisting essentially of ammonia gas and the vapor of said organic compound; and
  (b) heating said two phase system at a temperature from about 1350° C. to about 1800° C. for a time to form said high purity silicon nitride.

* * * * *